United States Patent [19]

Dinger et al.

[11] Patent Number: 4,669,269
[45] Date of Patent: Jun. 2, 1987

[54] TURBOCHARGED INTERNAL COMBUSTION ENGINE

[75] Inventors: Hans Dinger; Helmut Klotz, both of Friedrichshafen, Fed. Rep. of Germany

[73] Assignee: MTU Motoren- und Turbinen- Union Friedrichshafen GmbH, Fed. Rep. of Germany

[21] Appl. No.: 837,179

[22] Filed: Mar. 7, 1986

[30] Foreign Application Priority Data

May 15, 1986 [DE] Fed. Rep. of Germany ....... 3517549

[51] Int. Cl.$^4$ .............................................. F02B 37/04
[52] U.S. Cl. ......................................... 60/609; 60/612
[58] Field of Search ............... 60/597, 598, 605, 609, 60/610, 612

[56] References Cited

U.S. PATENT DOCUMENTS

| 2,296,268 | 9/1942 | Buchi | 60/610 |
| 4,453,381 | 6/1984 | Dinger | 60/612 |

FOREIGN PATENT DOCUMENTS

| 606244 | 10/1960 | Canada | 60/612 |
| 160008 | 2/1933 | Switzerland | 60/612 |
| 267149 | 8/1927 | United Kingdom | 60/612 |
| 1181488 | 2/1970 | United Kingdom | 60/612 |

*Primary Examiner*—Michael Koczo
*Attorney, Agent, or Firm*—Barnes & Thornburg

[57] ABSTRACT

A supercharged internal combustion engine for a drive system of land vehicle with an air filter (18) and a charging air manifold (12) connected with each other by several flow paths (21, 22, 23) for the combustion air. Each flow path (21, 22, 23) is equipped with a check valve (19, 36, 26) while the flow path (22) is additionally equipped with a controllable closure device (20) and the flow paths (22, 23) are equipped with one charging air compressor (27, 31) each. The charging air compressor (27) includes a drive by an exhaust gas turbine (28). The charging air compressor (31) is driven by an electric motor (32) with permanent magnet energization, whereby the energy for feeding the electric motor (32) is supplied by a generator (33) energized by permanent magnet and driven by the internal combustion engine (11). Depending on the operating condition of the internal combustion engine (11), one of the flow paths or several flow paths are simultaneously in operation. Especially during acceleration operations, an optimal supply with combustion air is achieved thereby. Since the charging air compressors (27, 31) are operated by energy of the internal combustion engine (11), the availability of the energy for the drive of the charging air compressors (27, 31) corresponds to the operating capability of the internal combustion engine (11).

25 Claims, 3 Drawing Figures

TURBOCHARGED INTERNAL COMBUSTION ENGINE

The present invention relates to a supercharged internal combustion engine for a drive system of land vehicles in which an air filter and a charging air manifold of the supercharged internal combustion engine are connected with each other by several flow paths for the combustion air, and in which a first flow path includes a check valve and at least a second flow path includes a charging air compressor, whereby on the suction side of the charging air compressor, a controllable closure device is arranged adapted to be controlled by operating parameters of the internal combustion engine, and the compressor is driven by energy of the internal combustion engine.

An internal combustion engine of the aforementioned type is disclosed in the DE-OS No. 24 16 287. During operation of this internal combustion engine an idling or at low partial load, the exhaust gas turbocharger is to maintain as high a rotational speed as possible. The air feed of the charging air compressor is thereby interrupted by closure of the suction line whereas the turbine receives constantly all of the available exhaust gases of the internal combustion engine. A by-pass line serves for the air supply of the internal combustion engine with a closed-off charging air compressor. During an acceleration operation of the internal combustion engine, an instantaneous charging air blast or shock is to result from the drive energy stored in the high rotational speed of the exhaust gas turbocharger when the suction line of the charging air compressor is suddenly opened. However, it has been found that the energy stored in the exhaust gas turbocharger is far too low in the lower idling operating range of the internal combustion engine in order to assure an effective charging air blast or shock. It is also known in the prior art to assure the charging air supply of an internal combustion engine at certain operating conditions in that an additional charging air compressor is provided which is driven from an auxiliary energy source. However, by reason of the required energy generating system, or corresponding energy storage device, and by reason of the limited space availability and the weight limitations to be considered, the problem of making available auxiliary energy has been solved heretofore only unsatisfactorily in land vehicles.

It is therefore the principle object of the present invention to provide for a supercharged internal combustion engine a supply with combustion air that is optimum under all operating conditions, especially for acceleration operations, in which the availability of auxiliary energy is matched to the operating capability of the internal combustion engine.

The underlying problems are solved in accordance with the present invention in that the energy for the drive of the charging air compressor in the second flow path is obtained from the exhaust gases of the internal combustion engine by an exhaust gas turbine that cannot be cut off, in that a third flow path includes a charging air compressor with a chuck valve arranged on the suction side, in that a permanent magnetic electric motor is provided for the drive of the charging air compressor in the third flow path and in that the energy for feeding the electric motor is supplied by a permanent magnet generator driven by the internal combustion engine.

The principal advantages achieved with the present invention reside especially in that an optimum acceleration behavior of the internal combustion engine within the entire operating range results by reason of the flow paths matched to the different critical operating conditions, in that the energy for the operation of the electric motor is available to the same extent as fuel is present for the internal combustion engine, in that an extraordinarily compact construction is realized with the use of the permanent magnet energization of the generator and electric motor, as a result of which structural volumes, respectively, weight for the realization of the third flow path plays a subordinate role, and in that a particularly good charging air supply of the internal combustion engine is attained by means of the electric drive for the charging air compressor of the third flow path during acceleration operations from low rotational speeds.

These and other objects, features and advantages of the present invention will become more apparent from the following description when taken in connection with the accompanying drawing which shows, for purposes of illustration only, several embodiments in accordance with the present invention, and wherein.

Figures 1, 3:
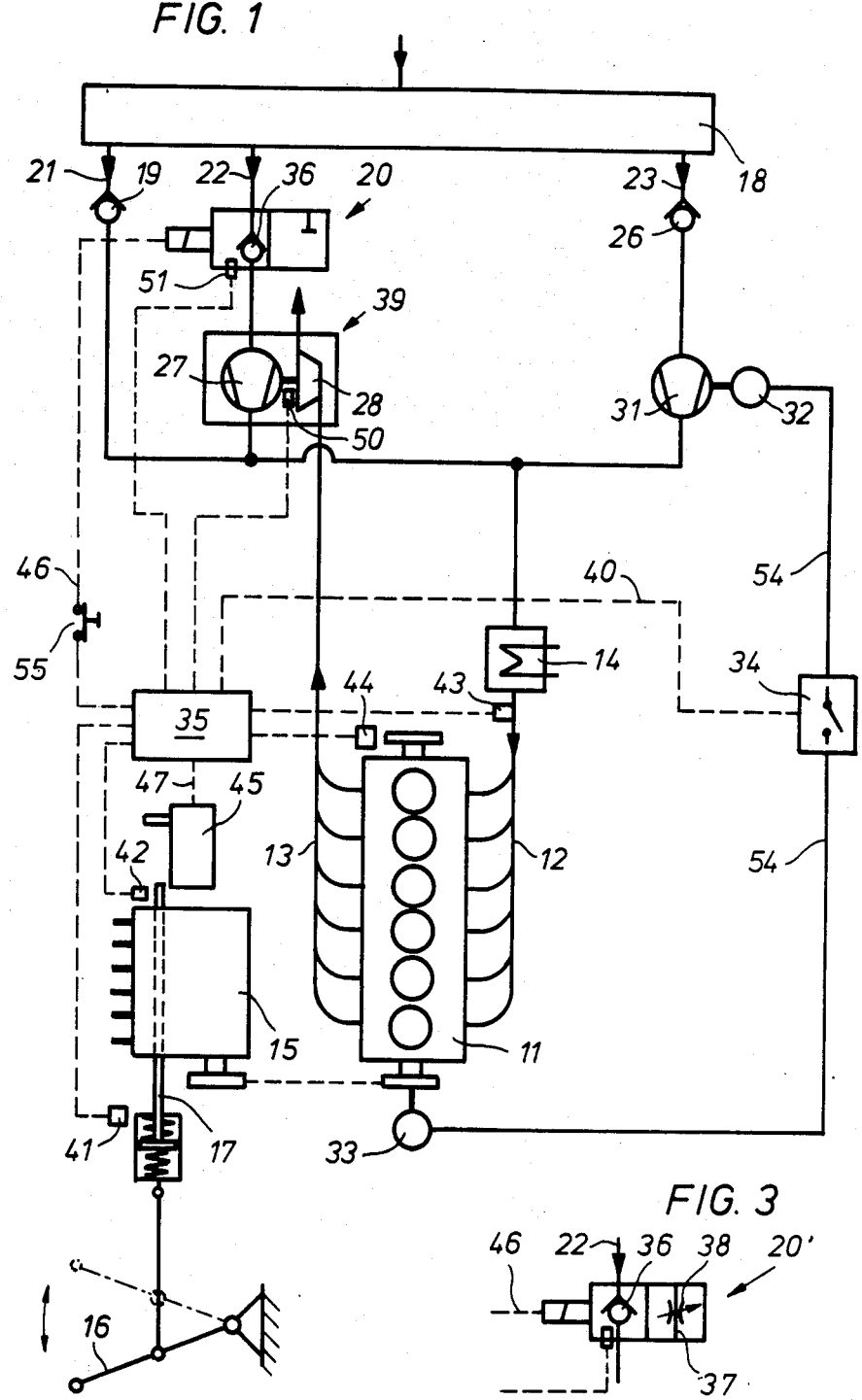
FIG. 1 is a schematic view of a supercharged internal combustion engine with three different flow paths for the combustion air in accordance with the present invention.
FIG. 3 is a partial schematic view of a modified embodiment for the construction of a closure device in a compressor suction line in accordance with the present invention.

Referring now to the drawing wherein like reference numerals are used throughout the various views to designate like parts, a supercharged internal combustion engine 11 for a drive system (not shown) of a land vehicle is equipped with an air filter 18, with a charging air manifold 12, with a charging air cooler 14, with an exhaust gas manifold 13, with a fuel injection pump 15, with an output adjusting device 16 acting on the fuel injection pump 15, and with a preferably electronically operating control system 35.

According to FIG. 1, the air filter 18 and the charging air manifold 12 are connected with each other by three different flow paths 21, 22, 23 for the combustion air whereby the flow paths combine upstream of the charging air cooler 14. The first flow path 21 contains a check valve 19 which opens in the flow direction toward the charging air manifold 12. The flow path 21 serves for the supply with combustion air when the internal combustion engine 11 operates in the so-called suction or induction line operation.

A charging air compressor 27 is arranged in the second flow path 22, which together with an exhaust gas turbine 28 forms an exhaust gas turbocharger generally designated by reference numeral 39. A controllable closure device generally designated by reference numeral 20 is disposed in the suction line of the charging air compressor 27, which can assume two shifting positions. In the first shifting position, a check valve 36 which opens in the flow direction toward the charging air manifold 12, is effective in the open position (through-passage) of the closure device 20. In the second shifting position of the closure device 20 the through-passage is closed off. The second flow path 22 is effective in the first shifting position of the closure device 20 when the internal combustion engine operates within an operating range in which the exhaust gas yield is sufficient to produce the necessary precompressed charging air by the exhaust gas turbocharger 39. However, the closure device 20 is also in the first shifting position if the function of the check valve 36 is necessary for acceleration operations at certain operating conditions of the internal combustion engine 11.

According to FIG. 3 with an alternative closure device 20', the second shifting position may include a passage 37 with an adjustable throttle 38, by means of which a limited air flow of the charging air compressor 27 is adjustable. An internal cooling of the charging air compressor 27 is attained therewith, in the case of need, in the turned-off condition.

The third flow path 23 contains a charging air compressor 31 which is driven by an electric motor 32 energized by a permanent magnet. A check valve 26 is arranged on the suction side of the charging air compressor 31 which opens in the flow direction toward the charging air manifold 12. The energy for the operation of the electric motor 32 is supplied by a generator 33 energized by a permanent magnet and driven by the internal combustion engine 11. The energy which is produced by the generator 33 at a relatively low internal combustion engine rotational speed, is converted by a frequency converter device with fixed or variable converter ratio which is contained in the electronic control 34, in such a manner that the electric motor 32 attains the high rotational speed necessary for the drive of the charging air compressor 31.

The high output concentration of the permanent magnet electric motor 32 with small structural mass brings about such a rapid increase of the rotational speed of the charging air compressor 31 from standstill that a nearly delay-free charging air supply is initiated. An acceleration capability is attained therewith which was not deemed realizable heretofore with supercharged internal combustion engines.

Different sensors for certain operating magnitudes of the internal combustion engine 11 are connected to the control device 35. For example, the sensor 41 supplies a signal for the desired value of the output predetermination by the output adjusting device 16 while the sensor 42 produces a signal for the actual value of the instantaneous position of the control rack 17 of the fuel injection pump 15. The actual rotational speed of the internal combustion engine 11 is detected by means of the sensor 44, the actual rotational speed of the exhaust gas turbocharger 39 is detected by means of the sensor 50 and the instantaneous pressure in the charging air manifold 12 is detected by means of the sensor 43. Further sensors not illustrated in part, are connected with the control device 35 for the complete reproduction of the operating condition of the internal combustion engine 11.

The operation of the internal combustion engine 11 is influenced by way of different command outputs of the control device 35. The closure device 20, respectively, 20' is thereby actuated by means of the command line 46, an adjustable stop 45 for limiting the adjusting path of the control rack 17 is controlled by means of the command line 47 and the electronic control 34 is activated by means of the command line 40.

The sequence of an acceleration operation is dependent on the operating condition of the internal combustion engine and on the starting spectrum of the participating components. For the embodiment according to FIG. 1, two different acceleration sequences to be described hereinafter result therefrom.

Starting with an operating condition in which the internal combustion engine 11 operates corresponding to the instantaneous position of the output adjusting device 16 within the range of lower idling up to lower partial load, the first acceleration sequence results. The exhaust yield of the internal combustion engine 11 is thereby very small. The closure device 20, 20' is in the first shifting position and the exhaust gas turbocharger 39 rotates with a low rotational speed resulting from the instantaneous exhaust gas yield. Depending on the pressure resulting thereby in the charging air line 12, either the check valves 19, 26 and 36 of all three flow paths 21, 22 and 23 or only the check valve 36 in the flow path 22 are opened.

A shifting-up of the internal combustion engine 11 into a high output range is now initiated by way of the output adjusting device 16. By reason of the still low rotational speed of the exhaust gas turbocharger 39, the signal of the rotational speed sensor 50 brings about by way of the control device 35 an activation of the electronic control 34 and the engagement of the electric motor 32. The supply of the charging air compressor 31 in the third flow path 23 thereupon starts suddenly, impact-like. The rising pressure in the charging air line 12 effects in the flow paths 21 and 22 a closing of the check valves 19 and 36 so that no combustion air can escape thereat. The availability of combustion air increases very rapidly by the operation of the charging air compressor 31. To the same extent the exhaust gas yield of the internal combustion engine 11 also increases. The rotational speed of the exhaust gas turbocharger 39 therewith increases. The simultaneously increasing supply of the charging air compressor 27 reduces continuously the pressure built up by the charging air compressor 31 on the suction side of the charging air compressor 27 which initially held the check valve 36 closed. The opening of the check valve 36 which finally takes place after a further pressure reduction, produces a signal in a sensor 51 which causes the control device 35 to bring about a standstill of the electric motor 32 by way of the signal line 40 and the control device 34. During the further acceleration operation of the internal combustion engine 11, the charging air supply takes place exclusively by the exhaust gas turbocharger 39. The pressure which has now been built up in the charging air line 12 by the charging air compressor 27, effects the closure of the check valves 19 and 26.

Two criteria are determinative for limiting the acceleration sequence described hereinabove. One criterion results from the characteristics of the electrically driven charging air compressor 31 which, by reason of its design, can be used effectively only within a limited range of the internal combustion engine rotational speed. The second limiting criterion results from the thermodynamic interrelationship between the exhaust gas supply of the internal combustion engine 11 and the capability dependent on the design of the exhaust gas turbocharger 39 to reach a rotational speed maximum with turned-off charging air compressor 27.

The second acceleration sequence which results therefore from the arrangement according to FIG. 1, starts from an operating condition in which the internal combustion engine 11 operates in the suction or induction engine operation at middle up to high rotational speeds corresponding to the instantaneous position of the output adjusting device 16.

In expectation of an acceleration operation, the control device 35 is caused by the influencing operating magnitudes of the internal combustion engine to adjust the closure device 20, respectively, 20' into the second shifting position by way of the command line 46. The feed of the charging air compressor 27 is therewith completely interrupted at the closure device 20 and practically completely interrupted at the closure device 20' by reason of the adjustable throttle 38.

By reason of the slight pressure in the charging air line 12 during the suction or induction engine operation, the check valves 19 and 26 in the flow paths 21 and 23 are fully opened. The principal quantity of the combustion air sucked in by the internal combustion engine 11 will flow by way of the first flow path 21 by reason of the low flow resistance, for in the third flow path 23 the standing still charging air compressor 31 forms a flow brake considerably limiting the mass flow rate. More particularly, the charging air compressor 31 is prevented by the electric motor 32 from its freely running rotation caused by the air flow drag.

Each rotational pulse which is produced at the rotor of the charging air compressor 31 by air sucked therethrough, has as a consequence a self-induction of an electric motor force in the stator winding by reason of the permanent magnet energization in the electric motor 32 which brakingly counteracts a rotation of the charging air compressor 31.

The exhaust gas from the internal combustion engine 11 is fed to the exhaust gas turbine 28. The power input thereof is reduced by reason of the turned-off or cut-off charging air compressor 27. Consequently, a higher rotational speed will establish itself in the exhaust gas turbocharger 39 than would otherwise result by reason of the exhaust gas yield of the internal combustion engine in this operating condition and with turned-on charging air compressor 27.

A shifting-up of the internal combustion engine 11 into a high output range is now initiated by way of the power or output adjusting device 16. By reason of the rotational speed conditions in the exhaust gas tubocharger 39, the shifting-over of the closure device 20, respectively, 20' into the first shifting position is immediately initiated by the control device 35. By means of the energy stored in the super-elevated rotational speed of the exhaust gas turbocharger 39, the charging air compressor 27 is able to produce a charging air blast or shock during a short time interval when starting to feed. The internal combustion engine 11 receives thereby sufficient precompressed combustion air in order to complete the further acceleration sequence without further assist. A pressure will build up in the charging air line with the feed of the charging air compressor 27 which brings about the closure of the check valves 19 and 26.

Figure 2:
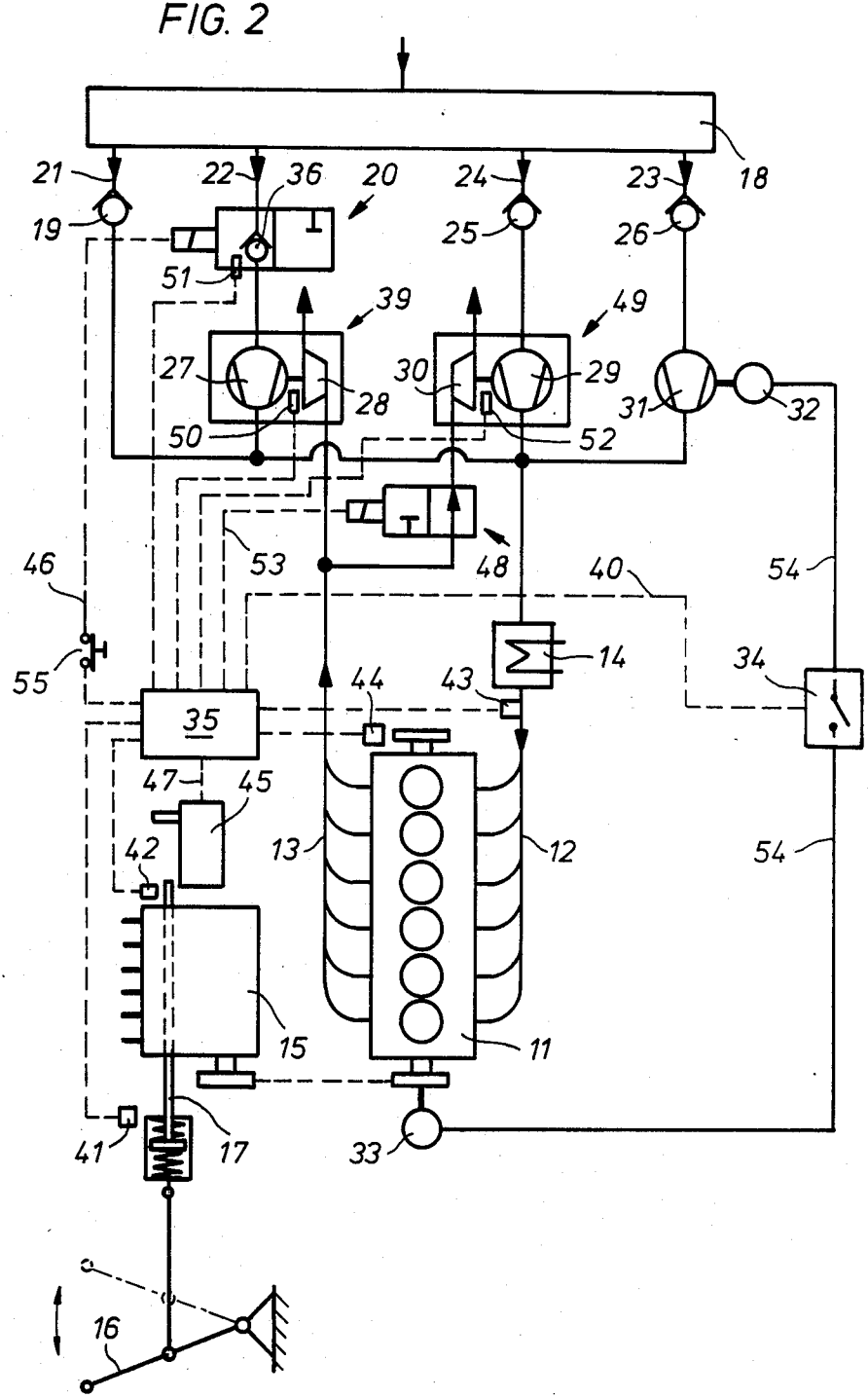
FIG. 2 is a schematic view of a supercharged internal combustion engine with four different flow paths for the combustion air in accordance with the present invention.

The embodiment according to FIG. 2, in contrast to the embodiment of FIG. 1, includes additionally a fourth flow path 24. The structural features described in connection with FIG. 1 are also present in a similar arrangement in the embodiment according to FIG. 2. Consequently, the same reference numerals are utilized for corresponding parts without repeating in detail the description thereof.

The fourth flow path 24 contains a charging air compressor 29 with a check valve 25 arranged on the suction side. The drive of the charging air compressor 29 takes place from an exhaust gas turbine 30. A closure device generally designated by reference numeral 48 which is arranged in the exhaust gas line leading to the exhaust gas turbine 30, is influenced by the control device 35 by way of a command line 53. The charging air compressor 29 and exhaust gas turbine 30 form the exhaust gas turbocharger generally designated by reference numeral 49 which together with the exhaust gas turbocharger 39 is designed for the maximum charging air- and exhaust gas mass flow of the internal combustion engine 11. If the internal combustion engine 11 operates at partial load with low charging air and exhaust gas mass flow, the exhaust gas turbocharger 49 is turned off or cut off by closure of the closure device 48. The exhaust gas turbine 28 of the exhaust gas turbocharger 39 then receives the entire exhaust gas mass flow and as a result thereof operates with improved efficiency.

During an acceleration operation of the internal combustion engine 11 from the lower idling speed, the sequence up to the activation of the electric motor 32 with the charging air compressor 31 corresponds to that according to the embodiment of FIG. 1. The increased exhaust gas supply of the internal combustion engine 11 which starts with the charging air feed by the charging air compressor 31, however, is initially supplied uniformly to both exhaust gas turbines 28 and 30 with an open closure device 48. The exhaust gas turbochargers 39 and 49 are accelerated thereby to a higher rotational speed. The check valves 19, 25 and 36 are thereby still closed under the influence of the charging air pressure in the charging air line 12 produced by the charging air compressor 31. In this operating condition the charging air compressors 28 and 29 do not contribute to the charging air supply. After reaching a predetermined rotational speed of the exhaust gas turbocharger 49 which is signalled by the rotational speed sensor 52, the control device 35 causes a shifting over the closure device 48 into the closing position. The exhaust gas turbocharger 49 is therewith cut off from the exhaust gas supply and continues to rotate with high idling rotational speed. The exhaust gases produced by the internal combustion engine 11 now reach entirely the exhaust gas turbine 28 of the exhaust gas turbocharger 39 whose rotational speed therewith continues to increase. The simultaneously increasing feed of the charging air compressor 27 brings about a continuing reduction of the pressure on the suction side of the charging air compressor 27 built up by the charging air compressor 31, which initially had still held closed the check valve 36. The opening of the check valve 36 which finally takes place after a further pressure reduction, produces in the sensor 51 a signal which causes the control device 35 to bring the electric motor 32 to a standstill by way of the signal line 40 and the electronic control 34. The renewed interconnection of the exhaust gas turbocharger 49 by opening of the closure device 48 takes place in the further sequence of the acceleration operation of the internal combustion engine 11 when the exhaust gas yield of the internal combustion engine 11 exceeds the absorption capability of the exhaust gas turbine 28 and the feed capability of the charging air compressor 27.

The entire acceleration operation of the internal combustion engine 11 proceeds in a few seconds. For that reason up to the interconnection of the exhaust gas turbine 30, the rotational speed of the exhaust gas turbocharger 49 which had been reached during the preceding short engagement phase, has dropped off only little. The slow-down period of time of an exhaust gas turbocharger up to standstill lasts several minutes with appropriate bearing support. During the renewed interconnection of the exhaust gas turbine 30, the further rotational speed increase thereof therefore starts at a very high rotational speed level so that the feed start of the charging air compressor 29 is reached very rapidly.

For the other acceleration operation of the internal combustion engine 11 at middle up to high rotational speeds from the suction or induction engine operation with the arrangement according to FIG. 2, the same limitations apply as described for the embodiment according to FIG. 1. The sequence prior to and after initiation of an acceleration sequence then takes place as follows:

In expectation of an acceleration operation, the control device 35 is caused by the influencing operating magnitudes of the internal combustion engine 11 to adjust the closure device 20, respectively, 20' into the second shifting position by way of the command line 46. The feed of the charging air compressor 27 is therewith completely interrupted by the closure device 20 or nearly completely interrupted by the closure device 20' by reason of the adjustable throttle 38.

By reason of the low pressure in the charging air line 12 during the induction engine operation, the check valves 19, 25 and 26 in the flow paths 21, 23 and 24 are fully opened. The principal quantity of the combustion air sucked in by the internal combustion engine 11 will flow by way of the flow paths 21 and 24 by reason of the low flow resistances, for the standing still charging air compressor 31 forms in the third flow path 23 a flow brake considerably limiting the mass flow as already described in connection with the embodiment according to FIG. 1.

The exhaust gas from the internal combustion engine 11 is therefore fed exclusively to the exhaust gas turbine 28. The power input thereof is reduced by reason of the cut-off charging air compressor 27. Consequently, a higher rotational speed will establish itself at the exhaust gas turbocharger 39 than would result by reason of the exhaust gas yield of the internal combustion engine 11 at this operating condition and with turned-on charging air compressor 27.

A shifting-up of the internal combustion engine 11 into a high output range is now initiated by way of the power or output adjusting device 16. By reason of the rotational speed conditions at the exhaust gas turbocharger 39, the shifting over of the closure device 20, respectively, 20' into the first shifting position is immediately initiated by the control device 35. With the energy stored in the super-elevated rotational speed, the charging air compressor 27 is able to produce with a starting feed a charging air blast or shock with starting feed during a short time interval. The combustion air which is subsequently increasingly precompressed, is fed from the charging air compressor 27 to the internal combustion engine 11. The rotational speed of the internal combustion engine 11 and the charging air pressure, respectively, what is equivalent, the rotational speed of the exhaust gas turbocharger 39 increase. When the exhaust gas yield of the internal combustion engine 11 has exceeded the absorption capacity of the exhaust gas turbine 28 and the feed capacity of the charging air compressor 27, the shifting over of the closure device 48 into the open position is initiated by the control device 35 by way of the command line 53. The exhaust gas turbocharger 49 is therewith also interconnected and increasingly partakes together with the charging air compressor 30 in the charging air supply of the internal combustion engine 11.

The exhaust gas turbines 28 and 30 may also be equipped with adjustable guide blades. They are therewith optimally matchable to the respective exhaust gas yield of the internal combustion engine 11. In the embodiment according to FIG. 2, the adjustable guide blades in the exhaust gas turbine 30 may additionally take over the function of the closure device 48 which, as a result thereof, can be dispensed with. The sequences of the acceleration operations do not change in principle with this construction of the exhaust gas turbines 28 and 30.

The use of permanent magnets of the rare earth—cobalt—type with the generator 33 and the electric motor 32 permit a particularly compact structural form and produce a high efficiency. These magnet materials are compatible with the counter-magnetization of high field strength which occur with electrical power machinery, whereby the permanent magnet flow may temporarily reach zero because after cancellation of the counter-magnetization the original flow is again present to the full extent.

With internal combustion engines of high power output with correspondingly large air and exhaust gas mass flow, or with the use of smaller structural sizes of exhaust gas turbochargers, at least two corresponding exhaust gas turbochargers operating in parallel may be arranged in the second and fourth flow path.

In the two described embodiments, the start of the electrically driven charging air compressor 31 is limited by reason of its aerodynamic design to a limited rotational speed range of the internal combustion engine 11. The arrangement of an adjustable diffusor at the charging air compressor 31 is a first measure in order to increase the utilization range.

Another possibility for an increased use of the electrical energy supplied by the permanent magnet energized generator, for the charging air supply of the internal combustion engine 11 during an acceleration operation, consists in the arrangement of two electrically driven charging air compressors. The charging air compressors may be designed for differently large charging air mass flows, whereby in a first range of the internal combustion engine rotational speed, during an acceleration operation, only the one and in an adjoining or overlapping rotational speed range only the other of these charging air compressors with electric drive are turned on or engaged.

The two charging air compressors with electric drive, however, may also have the same structural size whereby then initially one is in operation and the second is connected in beginning with a fixed operating condition.

An optimizing of the two electrically driven charging air compressors results if both compressors are equipped with one adjustable diffusor each.

During the operation of the internal combustion engine 11 within a rotational speed range which triggers the disconnection of the charging air compressor 27, an increased fuel consumption of the internal combustion engine 11 will result. This increased consumption results from an increased alternate charge work of the internal combustion engine 11. By reason of the absence of the charging air supply of the charging air compressor 27, the pistons of the internal combustion engine 11 must produce more work for sucking in the combustion air than with an engaged or turned-on charging air compressor 27. Additionally, the exhaust gas turbine 28 operating with higher rotational speed effects an increase of the exhaust work of the internal combustion engine 11. During operating periods of the internal combustion engine 11 which do not involve expectations of rapid acceleration operations, the mentioned increased consumption of fuel can be avoided. For that purpose, a manually actuated switch 55 is arranged in the command line 46 which may also be combined with the output adjusting device 16. With an open switch 55, the command line 46 is interrupted and the closure device 20, respectively, 20' remains in the first shifting position in which the check valve 36 is effective. For operating periods of the internal combustion engine 11 which may involve expectations of rapid acceleration operations, the switch 55 is closed so that all sequences described hereinabove are possible during acceleration operations.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A supercharged internal combustion engine for a drive system, comprising air filter means, charging air manifold means, several flow path means for the combustion air connecting with each other the air filter means and charging air manifold means, a first flow path means including a check valve and at least a second flow path means including a charging air compressor means, controllable closure means arranged on the suction side of the charging air compressor means, drive means for driving the charging air compressor means by energy of the internal combustion engine, control means influenced by operating magnitudes of the internal combustion engine for controlling the closure means, the energy for the drive means of the charging air compressor means in the second flow path means being obtained from the exhaust gases of the internal combustion engine by an exhaust gas turbine means, a third flow path means including a charging air compressor means with a check valve arranged on the suction side thereof, said drive means including an electric motor means energized by permanent magnet means for the drive of the charging air compressor means in the third flow path means, and a generator means energized by permanent magnet means and driven by the internal combustion engine for supplying the energy for feeding the electric motor.

2. An internal combustion engine according to claim 1, wherein a charging air compressor means with drive means by a disconnectable exhaust gas turbine means is arranged in a fourth flow path means.

3. An internal combustion engine according to claim 2, wherein a check valve is arranged on the suction side of the charging air compressor means in the fourth flow path means.

4. An internal combustion engine according to claim 2, wherein the controllable closure means of the second flow path means additionally includes a check valve.

5. An internal combustion engine with an exhaust gas feed line according to claim 2, wherein the disconnection of the disconnectable exhaust gas turbine means takes place by a controllable closure means arranged in the exhaust gas feed line.

6. An internal combustion engine according to claim 2, wherein the closure means of the disconnectable exhaust gas turbine means is formed by adjustable guide blades.

7. An internal combustion engine according to claim 2, wherein the control means triggers activation of at least one of the electric motor means and the disconnectable exhaust gas turbine means as a function of predetermined operating magnitudes.

8. An internal combustion engine according to claim 7, wherein the predetermined operating magnitudes delineate an operating range of the internal combustion engine which corresponds to the transition from induction engine operation into supercharging operation.

9. An internal combustion engine according to claim 1, wherein the generator means and electric motor means include permanent magnets of the rare earth—cobalt—type.

10. An internal combustion engine according to claim 2, wherein said second and fourth flow path means each include at least two corresponding exhaust gas turbocharger means operating in parallel.

11. An internal combustion engine according to claim 1, further comprising electronic control means arranged in an electric line between the electric motor means and the generator means which includes a frequency converter means.

12. An internal combustion engine according to claim 2, wherein the electrically driven charging air compressor means includes an adjustable diffusor.

13. An internal combustion engine according to claim 2, wherein at least two electrically driven charging air compressor means are arranged in the third flow path means.

14. An internal combustion engine according to claim 13, wherein the charging air compressor means are designed for differently large charging air mass flows.

15. An internal combustion engine according to claim 13, wherein the charging air compressor means are of substantially the same size construction.

16. An internal combustion engine according to claim 14, wherein the two charging air compressor means each include an adjustable diffusor.

17. An internal combustion engine according to claim 1, wherein the controllable closure means of the second flow path means additionally includes a check valve.

18. An internal combustion engine according to claim 1, wherein the control means triggers activation of at least one of the electric motor means and the disconnectable exhaust gas turbine means as a function of predetermined operating magnitudes.

19. An internal combustion engine according to claim 18, wherein the predetermined operating magnitudes delineate an operating range of the internal combustion engine which corresponds to the transition from induction engine operation into supercharging operation.

20. An internal combustion engine according to claim 1, wherein the electrically driven charging air compressor means includes an adjustable diffusor.

21. An internal combustion engine according to claim 1, wherein at least two electrically driven charging air compressor means are arranged in the third flow path means.

22. An internal combustion engine according to claim 21, wherein the charging air compressor means are designed for differently large charging air mass flows.

23. An internal combustion engine according to claim 22, wherein the two charging air compressor means each include an adjustable diffusor.

24. An internal combustion engine according to claim 21, wherein the charging air compressor means are of substantially the same size construction.

25. An internal combustion engine according to claim 24, wherein the two charging air compressor means each include an adjustable diffusor.

* * * * *